O. STERKEL.
AIR COOLING DEVICE.
APPLICATION FILED NOV. 26, 1913.
1,117,922.
Patented Nov. 17, 1914.
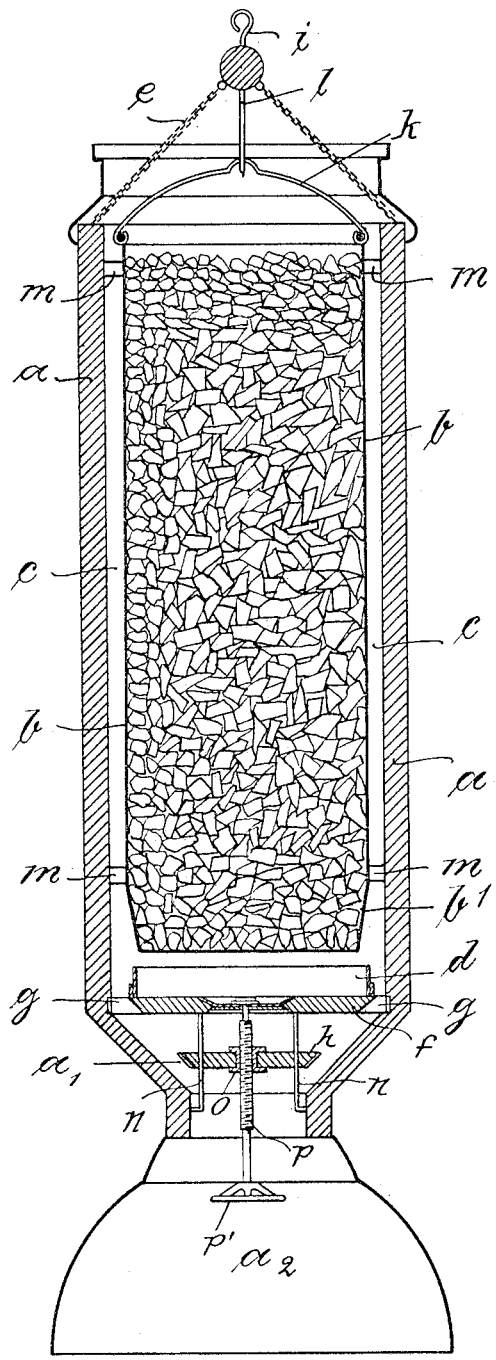
Witnesses:
B. A. Hanway.
R. D. Morrill
Inventor:
Otto Sterkel.
by Mason Fenwick & Lawrence
Attorneys.

UNITED STATES PATENT OFFICE.

OTTO STERKEL, OF RAVENSBURG, GERMANY.

AIR-COOLING DEVICE.

1,117,922. Specification of Letters Patent. Patented Nov. 17, 1914.

Application filed November 26, 1913. Serial No. 803,235.

*To all whom it may concern:*

Be it known that I, OTTO STERKEL, a subject of the King of Wurttemberg, residing at 38 Holbeinstrasse, Ravensburg, in the Kingdom of Wurttemberg, German Empire, have invented certain new and useful Improvements in Air-Cooling Devices, of which the following is a specification.

This invention relates to air cooling devices for the production of cold and dry air for use by invalids and others wherein the air cooling device comprises a central refrigerating chamber filled with the refrigerating mixture and an outer heat-insulating casing conforming in shape to the shape of the refrigerating chamber and spaced some little distance therefrom to form a narrow space around the refrigerating chamber, the air to be cooled and dried being caused to pass through this narrow space and thus in close contact to the refrigerating chamber. Since the refrigerating chamber is centrally arranged and the air caused to pass around the outside thereof it is possible to provide a sufficiently large cooling surface while at the same time causing the air to pass through in the form of a comparatively thin film.

In order that the invention may be more clearly understood, reference is made to the accompanying drawing showing one embodiment of the invention by way of example.

Within an outer heat-insulating casing $a$, preferably of cylindrical cross-section, is arranged a refrigerating receptacle $b$ to receive the refrigerating mixture. The outer casing $a$ is adapted to be hung in a position above the patient by means of chains $e$ connected to a central hook $i$ and the refrigerating receptacle $b$ is suspended within the outer casing $a$ by means of a spider $k$, preferably of wire, supported from the hook $i$ by means of a hanger $l$, the refrigerating receptacle $b$ being retained in proper position within the outer casing $a$ by means of spacing blocks or rings $m$. The receptacle $b$ is somewhat smaller than the interior of the outer casing $a$ and conforms in shape thereto so as to form a narrow space $c$ around the refrigerating receptacle $b$. The lower end of the receptacle $b$ is preferably slightly tapered at $b'$, the receptacle $b$ being suspended over a dish $d$ which collects the water condensing on the outside of the refrigerating receptacle. The dish $d$ rests upon a partition $f$ at the lower end of the outer casing $a$ provided with apertures $g$ for the passage of the air therethrough. The lower end of the casing $a$ terminates in a reduced or conical part $a'$ which is provided with a valve $h$ controlled in any suitable manner. The valve $h$ is preferably provided with a central nut $o$ threaded upon a screw-threaded spindle $p$ which is rotatably suspended from the partition $f$ and provided with a hand wheel $p'$ so that, on rotating the spindle $p$ the valve $h$ will be raised or lowered. The valve $h$ is preferably guided by means of wires $n$ secured to the partitions $f$ and to the lower end of the casing $a$. The valve $h$ may thus be opened more or less so that more or less air may pass out of the lower end of the apparatus into a substantially semi-spherically-shaped end piece or dome $a^2$ in order to be inhaled by the patient.

The warm and moist air enters the apparatus at the upper open end of the space $c$ and is cooled and dried by contact with the outer surface of the refrigerating receptacle $b$, the cold and dry air sinking downwardly and passing through the openings $g$ and valve $h$ into the dome $a^2$.

It will of course be understood that the refrigerating receptacle $b$ and outer casing $a$ instead of being cylindrical may be of any other desired shape, the essential feature being that the outer surface of the refrigerating receptacle $b$ conform substantially with the internal surface of the outer casing $c$.

By increasing the dimensions of the apparatus or by employing a plurality of such apparatus the inhaler may also be adapted for supplying rooms with cold and dry air.

I claim:—

1. An air cooling device comprising, in combination, an inner refrigerating receptacle, an outer heat-insulating casing and spaced somewhat therefrom to form a narrow space around said receptacle, through which the air to be cooled and dried is adapted to pass, a dish supported within said casing beneath said receptacle, a downwardly enlarging end piece at the lower end of said casing, and a valve intermediate said casing and end piece.

2. An air cooling device comprising, in combination, an inner refrigerating receptacle, an outer heat-insulating casing and spaced somewhat therefrom to form a narrow space around said receptacle, a perforated transverse partition at the lower end of said casing, a dish supported on said partition beneath said receptacle, a downwardly reduced extension at the lower end of said casing, a valve in said extension, and a dome-shaped end piece connected to said extension.

3. An air cooling device comprising, in combination, an inner refrigerating receptacle, an outer heat-insulating casing and spaced somewhat therefrom to form a norrow space around said receptacle, spacing members intermediate said receptacle and casing, means for suspending said receptacle within said casing, a perforated transverse partition at the lower end of said casing, a dish supported on said partition beneath said receptacle, a downwardly reduced extension at the lower end of said casing, a valve in said extension, and a dome-shaped end piece connected to said extension.

4. An air cooling device comprising, in combination, an inner cylindrical refrigerating receptacle, an outer cylindrical heat-insulating casing disposed relatively to said receptacle to form an annular space around said receptacle, a transverse perforated partition at the lower end of said casing, a dish supported on said partition beneath said receptacle, a conical extension at the lower end of said casing, a valve in said conical extension, and a dome-shaped end piece connected to and beneath said extension.

In testimony whereof I affix my signature in presence of two witnesses.

OTTO STERKEL.

Witnesses:
 FRIDA BLAIBA,
 ROSA THALBAUER.